No. 820,492. PATENTED MAY 15, 1906.
H. LE B. GRAY.
PHOTOGRAPHIC FILM CARTRIDGE.
APPLICATION FILED FEB. 4, 1905.
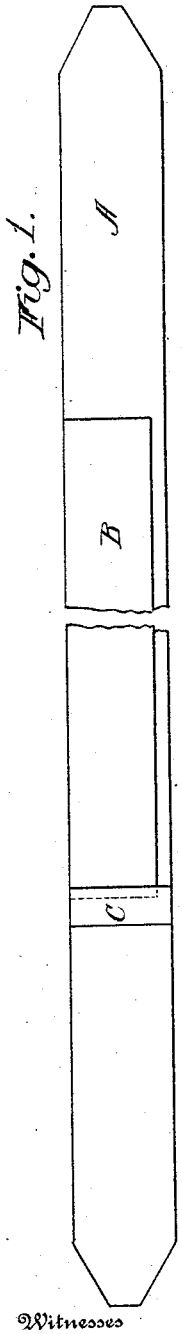
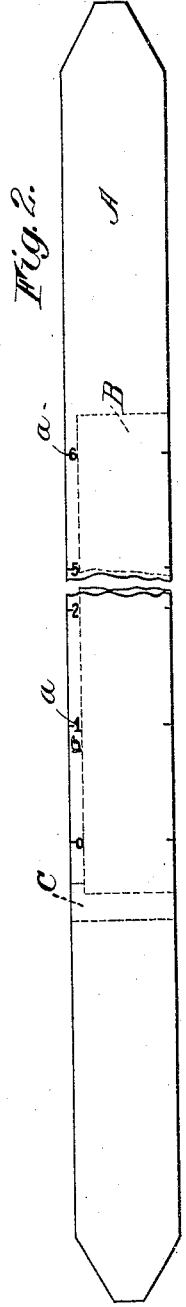
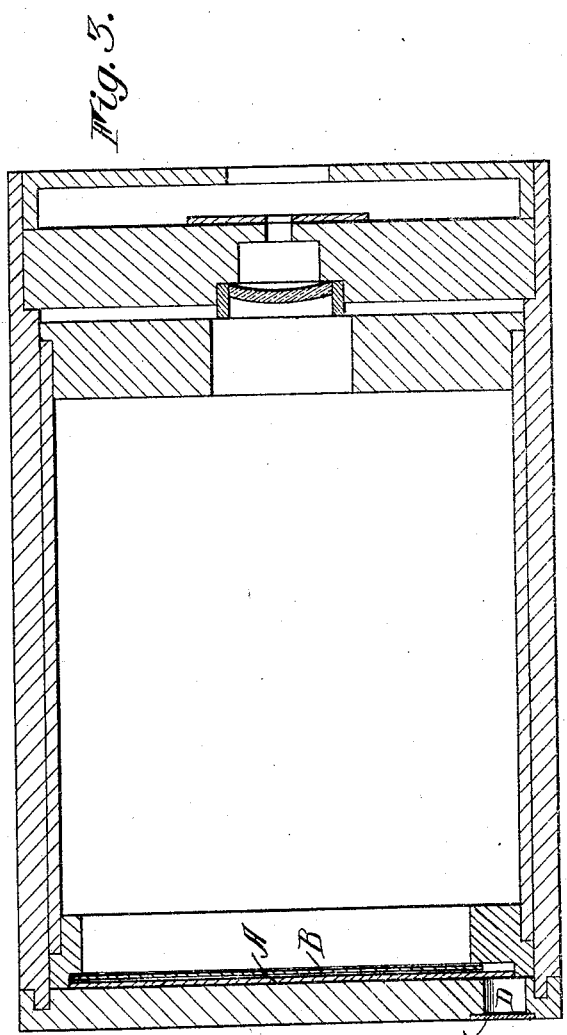
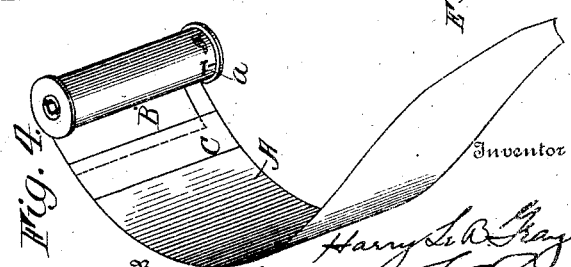

UNITED STATES PATENT OFFICE.

HARRY LE B. GRAY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

No. 820,492.   Specification of Letters Patent.   Patented May 15, 1906.

Application filed February 4, 1905. Serial No. 244,120.

*To all whom it may concern:*

Be it known that I, HARRY LE B. GRAY, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of the specification, and to the reference-letters marked thereon.

My present invention relates to photographic-film cartridges embodying a strip of sensitized film attached at one end or both, if desired, to a strip of flexible opaque material, such as black paper, adapted to serve as a covering for the film when rolled into a coil and also as backing moving with it through a camera or roll-holder, said strip also having upon it suitable indications for indicating the separate exposures of film and denoting the proper points for severing the same into separate exposures.

Heretofore some difficulty has been experienced in the use of film-cartridges of the general type referred to, and by reason of the fact that the marking upon the opaque covering and which are exposed through the sight-hole in the camera or roll-holder were located within the margin of the film, so that when the film and covering were wound together, the winding and severing marks, which were usually made in white material, would come in contact with the sensitized surface of the film and perhaps by reason of the absorption and subsequent dispersion of light or radiant energy would cause corresponding marks to be shown in the negatives after development. These marks also might possibly have been formed by the exposure of the rear of the black paper adjacent the markings and the action of strong sunlight through the inspection-aperture in the rear of the camera or holder; but it is sufficient to say that markings appeared in the developing-film corresponding to those on the covering-paper. To overcome these objections and at the same time preserve the general appearance and manner of using the well-known cartridges is the object of my invention, which is accomplished by making the covering-paper a trifle wider than the sensitized film and locating the indicating and severing-markings upon the wider edge of the black paper, so that they will not contact with the film when the cartridge is wound into a roll, and will not, therefore, be in a position to cause said markings to appear upon the film by reason of the relation to the film with the aperture in the camera or roll-holder.

In the accompanying drawings, Figure 1 is a plan view of the cartridge embodying my invention unwound; Fig. 2, a rear view of the same; Fig. 3, a vertical sectional view through a camera in which the cartridge is used. Fig. 4 is a perspective view of a film-cartridge embodying my invention partially unwound.

Similar reference-letters in the several figures indicate similar parts.

A indicates the backing or covering of flexible opaque material, preferably black paper; B the film attached thereto at one end by the paper or similar device C. The film, it will be noted, is, as usual, shorter than the covering-strip A, so that the extended ends will effectually protect the film, and it is also narrower than the paper and is also located its entire length nearer one side thereof, and it is upon this portion of the covering-paper over which the film does not extend that the indicating-marks $a$ are placed, said marks being on the rear of the paper, as shown in Fig. 2. The film and paper are wound, as usual, upon a spool; but it will be noted the markings do not when thus wound come in contact with the film.

The cameras and roll-holders in which these cartridges are used are arranged generally as shown in Fig. 3, with the sight-aperture D, covered by the colored glass E or other material, arranged so that the edge of the paper only will be exposed and the film will not be.

In Fig. 4 I have shown a cartridge and its spool with the film and paper partially unwound.

I claim as my invention—

1. A photographic-film cartridge embodying a covering-strip of flexible opaque material having indicating-marks near one edge and a superposed strip of sensitized flexible photographic film attached thereto, said film being shorter and narrower than the covering-strip and arranged at the side thereof so as to be clear of the markings thereon when the film and covering-strip are wound into a coil.

2. A photographic cartridge embodying a spool having flanged ends, a covering-strip of flexible opaque material and a strip of flexible sensitized film connected to the covering-strip and wound therewith on the spool, said covering-strip being longer and wider than the film and having at one edge suitable indicating-markings beyond the edge of the film and not covered by the latter when wound on the spool.

3. A photographic-film cartridge embodying a strip of flexible sensitized photographic film, and a covering-strip of flexible opaque material attached thereto at one end, said covering-strip being wider and longer than the film and having at one edge suitable markings located out of contact with the film when the strips are wound together.

HARRY LeB. GRAY.

Witnesses:
G. WILLARD RICH,
RUSSELL B. GRIFFITH.